United States Patent [19]

Fuchs et al.

[11] Patent Number: 5,556,907
[45] Date of Patent: Sep. 17, 1996

[54] CAOUTCHOUC MIXTURE, TREAD MADE THEREFROM AND TIRE WITH THIS TREAD

[75] Inventors: Hans-Bernd Fuchs, Alzenau-Hörstein; Dietrich Günter, Frankfurt am Main; Ulrich Steinbrecht, Ober-Ramstadt, all of Germany

[73] Assignee: SP Reifenwerke GmbH, Hanau, Germany

[21] Appl. No.: 373,391

[22] Filed: Jan. 17, 1995

[30] Foreign Application Priority Data

Jan. 24, 1994 [DE] Germany .......................... 44 01 934.3

[51] Int. Cl.⁶ ....................................................... C08K 3/36
[52] U.S. Cl. ...................... 524/493; 524/492; 524/505; 524/515; 524/525; 524/526; 525/88; 525/89
[58] Field of Search ...................................... 524/492, 493, 524/505, 515, 525, 526; 525/88, 89

[56] References Cited

U.S. PATENT DOCUMENTS 5,104,941  4/1992  Wolpers et al. ..................... 525/237
5,227,425  6/1993  Rauline ................................ 524/493
5,272,220  12/1993  Rodgers et al. ..................... 525/332.3

FOREIGN PATENT DOCUMENTS 0157703  5/1989  European Pat. Off. ..
0299074  1/1992  European Pat. Off. ..
0501227  9/1992  European Pat. Off. ..

*Primary Examiner*—Edward J. Cain
*Attorney, Agent, or Firm*—Birch, Stewart, Kolasch & Birch, LLP

[57] ABSTRACT

A caoutchouc mixture vulcanisable with sulphur, tyre treads manufactured therefrom and also tyres with a vulcanised tread are proposed. The caoutchouc mixture contains 30 to 100 parts by weight of isoprene-butadiene-styrene terpolymer with a glass transition temperature range between −90° C. and 20° C., 0 to 70 parts by weight of one or more further elastomers, 20 to 90 parts by weight of silica as filler material, customary additives and also a vulcanisation system. This caoutchouc mixture delivers tyre treads with good resistance to abrasion and a low loss factor which is correlated with a low running resistance.

12 Claims, No Drawings

CAOUTCHOUC MIXTURE, TREAD MADE THEREFROM AND TIRE WITH THIS TREAD

The present invention relates to a caoutchouc mixture vulcanisable with sulphur and containing at least one elastomer, at least filler material, customary additives and also a vulcanisation system. Furthermore, the invention relates to tyre treads which contain this caoutchouc mixture and also to tyres with a tyre tread which contains the vulcanised caoutchouc mixture.

The characteristics desired in tyres can only be simultaneously realised with difficulty because they are partly contradictary. Thus measures which lead to a reduction of the rolling resistance bring about a reduction of the resistance to abrasion (or scuffing resistance). The partial or complete substitution of carbon black by the filler material silica, for example, admittedly reduces the rolling resistance of the tyre but leads to deterioration of its resistance to abrasion. In EP 0 299 074 B1 it is proposed, in order to avoid this deterioration, that polymers which are modified with a special silane compound should be used for caoutchouc mixtures which contain large proportions of silica as a filler material. This measure is however unfavourable for industrial utilisation because of the use of special silane compounds.

In order to avoid this disadvantage a caoutchouc mixture is proposed in EP 0 501 227 which contains a copolymer of a conjugated diene and vinyl aromatic compound manufactured by solution polymerisation in a hydrocarbon solvent, a very special silica which is for example manufactured by the process described in EP 0 157 703 B1, customarily used additives and also a vulcanisation system. This caoutchouc mixture is manufactured in known manner by the stepwise mixing of the components, with temperatures being kept to at which cross-linking does not yet arise. A further dien elastomer, such as for example polyisoprene, natural caoutchouc or polybutadiene can be added to the caoutchouc mixture for dilution.

In the examples and comparative examples of this reference tyre treads are compared with one another which were manufactured from caoutchouc mixtures which contain styrene butadiene compolymers manufactured by emulsion polymerisation (known in the following as emulsion SBR) and special silica or classical silica or carbon black as a filler material, or which alternatively contain styrene butadiene copolymers manufactured by solution polymerisation (known in the following as solution SBR) and special silica or carbon black as filler material. From the quoted results it can be deduced that treads with emulsion SBR and carbon black have a good working life when subjected to abrasion but a poor rolling resistance, that treads with emulsion SBR and classical silica have a poor working life when subjected to abrasion but a good rolling resistance and that the treads claimed in EPO 501 227 A1, i.e. treads with solution SBR and special silica provide good results both with respect to rolling resistance and also with respect to the working life when subjected to abrasion.

The object of the invention is to make available caoutchouc mixtures which already lead to good results with respect to the resistance to abrasion and the rolling resistance in tyre treads with classical silica.

Starting from the initially named caoutchouc mixture vulcanisable with sulphur this object is satisfied in that the caoutchouc mixture contains 30 to 100 parts by weight of isoprene-butadiene-styrene terpolymer with a glass transition temperature range between −90° C. and +20° C., 0 to 70 parts by weight of one or more further elastomers and also 20 to 90 parts by weight of silica as filler, with all parts by weight being respectively related to 100 parts by weight of total elastomers.

Furthermore, tyre treads which contain this caoutchouc mixture and also tyres which have such treads vulcanised with sulphur are the subject of the invention.

It has surprisingly been found that caoutchouc mixtures with this composition lead to a resistance to abrasion which is comparable with the corresponding caoutchouc mixtures which only contain carbon black as a filler material but have a substantially lower tan $\delta$ (loss factor) than the corresponding caoutchouc mixtures with carbon black as a filler material. A lower tan $\delta$ is correlated with a lower rolling resistance. As can be found from the test results with respect to EPO 0 501 227 A1 the improved rolling resistance achieved with the substitution of classical silica for carbon black is bought at the expense of a substantial deterioration of the resistance to abrasion in so far as the caoutchouc mixtures contain emulsion SBR or solution SBR as elastomer. In accordance with the invention a deterioration of the resistance to abrasion is avoided even when using classical silica in that the caoutchouc mixture contains 30 to 100 parts by weight of isoprene-butadiene-styrene terpolymer as an elastomer related to 100 parts by weight of the total elastomers. The caoutchouc mixture of the invention can be used for the manufacture of treads which are suitable for the tyres of motorcars, motorcycles, 4×4 cross-country vehicles, transporters and light trucks.

The glass transition temperature range of the isoprene-butadiene-styrene copolymer used in accordance with the invention lies between −90° C. and +20° C. The values relate to the glass transition temperature as determined by the torsional pendulum method.

The caoutchouc mixture of the invention preferably contains 50 to 100 parts by weight and preferably 70 to 100 parts weight of terpolymer related to 100 parts by weight of total elastomers.

The terpolymer preferably contains 5 to 30% by weight of isoprene, 40 to 80% by weight of butadiene and 15 to 30% by weight of styrene. The isoprene of the terpolymer preferably has a 3,4 isoprene content of 40 to 60% and the butadiene a 1,2 butadiene content of 20 to 70%. In a particularly preferred embodiment the isoprene of the terpolymer has a 3,4 bond content of 55 to 60% by weight and the butadiene has a 1,2 bond content of 25 to 30% by weight.

As further elastomers the caoutchouc mixtures of the invention can preferably contain 0 to 50 parts by weight of natural caoutchouc, 0 to 50 parts by weight of a copolymer of conjugated diene and vinyl aromatic compound manufactured by emulsion polymerisation and/or 0 to 30 parts by weight of polybutadiene, with all the parts by weight being respectively related to 100 parts by weight of total elastomers. The total content of these further elastomers in the caoutchouc mixture of the invention can amount to 0 to 70 parts by weight related to 100 parts by weight of total elastomers. 1,3 butadiene, isoprene and 2,3 dimethyl-1,3-butadiene are suitable as the conjugated dien of the copolymer manufactured by emulsion polymerisation. Styrene and o-, m- and p-methyl styrene are suitable as the vinyl aromatic compound of the copolymer. The copolymer is preferably styrene-butadiene copolymer with a glass transition temperature between −20° C. and −70° C. determined in accordance with the torsional pendulum method.

Polybutadienes with a 1,4-cis bound content, in particular above 90%, are preferably used as polybutadiene.

The elastomers can be added in the form of oil extended polymers. As a rule the total oil content of the caoutchouc mixture, i.e. free oil and oil content of the elastomers lies in the range from 10 to 50 parts by weight per 100 parts by weight of total elastomers.

As a filler material the caoutchouc mixture of the invention contains silica in a quantity of 20 to 90 parts by weight per 100 parts by weight of total elastomer content. As silica one can use both "classical" silica and also silica with optimised disperability in the caoutchouc mixture. Under the term "classical" silica there is to be understood a silica which is customarily used for tyre manufacture and is offered as a commercial product from various manufacturers. These silicas normally have a BET surface between 100 and 250 m²/g in accordance with DIN 66 131, ISO 5794/1 Annex D, a CTAB surface between 100 and 250 m²/g in accordance with ISO 6810, ASTM D-3765 and an oil take up measured with DBP between 150 and 250 ml/100 g in accordance with ISO S-4656, ASTM D-2414, DIN 53601. As silica with optimised dispersability one can for example use silica as described in EP-0 157 703 B1.

The caoutchouc mixture preferably contains 50 to 80 parts by weight of silica per 100 parts by weight of total elastomers.

As a further filler material the caoutchouc mixture of the invention can contain carbon black. The carbon black content should not be higher than the silica content and the total content of filler materials should not lie higher than 90 parts by weight related to 100 parts by weight of total elastomers. Additionally carbon black can be contained in the reinforcing filler (intensifier).

The caoutchouc mixture of the invention can contain aromatic and/or naphthenic oils, reinforcing filler, aging protection means, tackifiers, activators or processing agents as customary additives. All these additives are used in the customary range of quantities. If a part of the silica is substituted by carbon black then the reinforcing filler is added in a smaller quantity. Furthermore, the caoutchouc mixture of the invention contains a vulcanisation system with sulphur and vulcanisation accelerators.

The caoutchouc mixture can be manufactured in accordance with the following multi-stage process. In a first stage the elastomer or the elastomers is/are mixed with the customary additives and the silica in a kneader. During this the temperature should not rise to values at which cross-linking already occurs. Usually temperatures of 160° to 170° C. should not be exceeded. After the cooling down of the mixture it is kneaded again in a second stage and again the temperature should not rise to values at which a cross-linking occurs. In a subsequent third stage the vulcanisation system is worked in on a roll, and the temperatures are also kept below the cross-linking temperature during this. The times for the mixing processes in the individual stages are each so selected that a good throughmixing of the components is achieved.

The invention will be explained in more detail with respect to the following examples.

The characteristics of the caoutchouc mixtures of the invention and of the caoutchouc mixtures manufactured for comparison purposes were in each case determined from respective vulcanised test bodies manufactured from the mixtures. For the determination of the loss factor (tan δ) reference is made to DIN 53513. The abrasion resistance was determined in accordance with DIN 53516.

Five caoutchouc mixtures were manufactured with the compositions set forth in the following table, with the parts by weight of the components being respectively set forth in the mixtures. The mixtures 1 to 3 are mixtures in accordance with the invention, the mixtures 4 and 5 are comparison mixtures.

TABLE

| CAOUTCHOUC MIXTURE | 1 | 2 | 3 | 4 | 5 |
|---|---|---|---|---|---|
| Components | | | | | |
| Terpolymer 1 | 100 | | 100 | 100 | |
| Terpolymer 2 | | 100 | | | 100 |
| Silica VN3 | 65 | 65 | 32.5 | | |
| Carbon black N 234 | | | 32.5 | 65 | 65 |
| Reinforcing filler | 10.4 | 10.4 | 5.2 | | |
| Zinc oxide | 3 | 3 | 3 | 3 | 3 |
| Stearic acid | 2 | 2 | 2 | 2 | 2 |
| Aromatic oil | 16 | 16 | 16 | 16 | 16 |
| Aging protection agent | 2 | 2 | 2 | 2 | 2 |
| Tacifier | 1.5 | 1.5 | 1.5 | 1.5 | 1.5 |
| Vulcanisation accelerator A | 1.7 | 1.7 | 1.7 | 1.3 | 1.3 |
| Vulcanisation accelerator B | 1.5 | 1.5 | 1.5 | 0.3 | 0.3 |
| Sulphur | 1.4 | 1.4 | 1.4 | 1.7 | 1.7 |
| Reference values for the measured tan δ at 70° C. | 140 | 142 | 120 | 100 | 103 |
| Working life when subjected to abrasion | 102 | 101 | 99 | 100 | 99 |

The components set forth in the above table I are explained as follows:

Terpolymer 1: Isoprene-butadiene-styrene terpolymer with a glass transition temperature range from −90° C. to +20° C.

Terpolymer 2: Isoprene butadiene styrene terpolymer with a glass transition temperature range from −90° C. to 20° C.

The terpolymers are distinguished by their molecular build-up as a consequence of the conduct of the process during the polymerisation.

Silica VN3: BET surface 170 m²/g, a commercial product of Degussa Ultrasil® VN3 granulate.

Carbon black N 234: BET surface 125 m²/g, determined in accordance with ISO S-4652, ASTM D-3037, DIN 66132; CTAB surface 120 m²/g, determined in accordance with ISO 6810, ASTM D-3765; DBP absorption 125 ml/100 g, determined in accordance with ISO S-4656, ASTM D-2414, DIN 53601.

Reinforcing filler (intensifier): Mixture in the ratio 1:1 of carbon black N 330 and polysulphidic organosilane, commercial product of Degussa X 50-S.

Aging protection agent: Mixed di-aryl-p-phenylene diamine.

Tackifier: Condensation products of p tert. octyl phenol and formaldehyde.

Vulcanisation accelerator A: CBS (N-cyclohexyl-2-benzo-thiazolsulfene amide)

Vulcanisation accelerator B: DPG (N,N' diphenyl guanidine).

The caoutchouc mixtures 1 to 5 were respectively manufactured as follows: In a kneader with a kneader temperature of 50° C. and a speed of kneader rotation of 50 per min. the terpolymer was added into a first stage and kneaded. Then zinc oxide, stearic acid, aging protection agent and tackifier were added and kneaded in. Thereafter, in the case of the mixtures 1 and 2, in each case half of the silica, of the reinforcing filler and of the aromatic oil, were added and kneaded in. In the case of the mixture 3, in each case half of the silica, of the carbon black, of the reinforcing filler and of the aromatic oil were added and kneaded in. In the case of the mixtures 4 and 5 in each case half of the carbon black and of the aromatic oil were added and kneaded in. Finally, the second half of the above named components was added and kneaded in. During the entire mixing process a maximum temperature of 160° C. was kept to.

After the cooling down of the mixtures they were kneaded again in a second stage, and again a temperature of 160° C. was not exceeded. The second stage was carried out only for the caoutchouc mixtures 1 to 3 not however for the carbon black mixtures. Finally, the vulcanisation system comprising sulphur and vulcanisation accelerators was mixed in on a roll in a third stage (in the second stage for the mixtures 4 and 4). During this a temperature below the cross-linking temperature was also kept to.

Abrasion and loss factor tan $\delta$ were then determined for the sample bodies manufactured from the caoutchouc mixtures. The value 100 was associated with the values measured for the caoutchouc mixture 4 and the values measured for the other caoutchouc mixtures were respectively set forth in the table as relative values with respect to the reference value 100. Values over 100 signify an improvement of the characteristics.

As can be found from the values set forth in the table the working life of the caoutchouc mixtures of the invention when subjected to abrasion is approximately comparable with the working life under abrasion of the corresponding caoutchouc mixtures which contain only carbon black instead of silica. This was not to be expected because, in accordance with the statements in EP 0 501 227 A1, the substitution of carbon black by silica leads to a substantial deterioration of the working life when subjected to abrasion in so far as the caoutchouc mixture contains emulsion SBR. With the caoutchouc mixture of the invention one thus achieves a substantial improvement of the tan $\delta$ value which is correlated with the rolling resistance without the working life when subjected to abrasion becoming worse.

We claim:

1. Caoutchouc mixture vulcanisable with sulphur and containing at least one elastomer, at least one filler, customary additives and also a vulcanisation system, wherein the caoutchouc mixture contains 30 to 100 parts by weight of isoprene-butadiene-styrene terpolymer with a glass transition temperature range between −90° C. and +20° C., the isoprene of the terpolymer having a 3,4 bond content of 40 to 60% by weight and the butadiene having 1,2 bond content of 20 to 70% by weight; 0 to 70 parts by weight of one or more further elastomers; and 20 to 90 parts by weight of silica as filler, with all parts by weight being respectively related to 100 parts by weight of total elastomers.

2. Caoutchouc mixture in accordance with claim 1, wherein the isoprene-butadiene-styrene terpolymer consists of 5 to 30% by weight of isoprene, 40 to 80% by weight of butadiene and 15 to 30 % by weight of styrene.

3. Caoutchouc mixture in accordance with claim 1, wherein the isoprene-butadiene-styrene terpolymer contains 10 to 20% by weight of isoprene, 60 to 70% by weight of butadiene and 15 to 30% by weight of styrene.

4. Caoutchouc mixture in accordance with claim 1, wherein the isoprene of the terpolymer has a 3,4 bond content of 55 to 60% by weight and the butadiene has a 1,2 bond content of 25 to 35% by weight.

5. Caoutchouc mixture in accordance with claim 1, wherein said mixture contains 50 to 100 parts by weight of isoprene-butadiene-styrene-terpolymer related to 100 total parts by weight of total elastomers.

6. Caoutchouc mixture in accordance with claim 1, wherein said mixture contains as further elastomers 0 to 50 parts by weight of copolymer of conjugated diene and vinyl aromatic compound manufactured by emulsion polymerisation and/or 0 to 30 parts by weight polybutadiene, whereby all parts by weight are respectively related to 100 parts by weight of total elastomers.

7. Caoutchouc mixture in accordance with claim 6, wherein said mixture contains styrene-butadiene copolymer with a glass transition temperature between −20° C. and −70° C. manufactured by emulsion polymerisation.

8. Caoutchouc mixture in accordance with claim 1, wherein the silica has a BET surface between 150 and 250 m$^2$/g.

9. Caoutchouc mixture in accordance with claim 1, wherein said mixture contains carbon black as a further filler material, with the carbon black content being at most as large as the proportion of silica.

10. Caoutchouc mixture in accordance with claim 1, wherein said mixture contains 50 to 80 parts by weight of silica related to 100 parts by weight of total elastomers.

11. Tyre tread containing a caoutchouc mixture vulcanisable with sulphur in accordance with claim 1.

12. A tyre which contains a tread in accordance with claim 10 vulcanised with sulphur.

* * * * *